United States Patent [19]

Chun et al.

[11] 3,912,047
[45] Oct. 14, 1975

[54] METHOD AND APPARATUS FOR COLLECTION OF NEWSPAPERS FOR RECYCLING

[76] Inventors: Joong Hee Chun, 11407 Brighton; Bernard L. Shaw, 11426 Scottsdale, both of Stafford, Tex. 77477

[22] Filed: Sept. 30, 1974

[21] Appl. No.: 510,244

[52] U.S. Cl. .................................. 186/1 R; 177/50
[51] Int. Cl.² ........................................ B65G 37/00
[58] Field of Search ....... 186/1 R, 26; 214/1 R, 152, 214/2, 6 F; 177/3, 50, 52, 145, 245, DIG. 6; 194/2; 100/1

[56] References Cited
UNITED STATES PATENTS

| | | | |
|---|---|---|---|
| 2,116,895 | 5/1938 | Howard | 177/52 |
| 2,182,408 | 12/1939 | Phillips et al. | 177/52 |
| 2,709,076 | 5/1955 | Hansen | 177/3 |
| 3,085,640 | 4/1963 | Allen | 177/3 |
| 3,171,347 | 3/1965 | Elrod | 100/1 |
| 3,265,140 | 8/1966 | Mayer | 177/52 X |
| 3,716,697 | 2/1973 | Weir | 186/1 R X |

Primary Examiner—Frank E. Werner
Attorney, Agent, or Firm—Bard, Springs, Matthews & Jackson

[57] ABSTRACT

A method and apparatus according to the present invention for collection of newspapers as well as other paper products, for the purpose of recycling of the same, may incorporate provision of a paper bundle inspection and collection module that may be provided at remote locations within which bundles of paper may be accumulated, which bundles will be of predetermined size and weight for efficient mass handling. After newspapers have been collected to form a bundle of predetermined size and shape, the bundles are bound to prevent separation and may then be transported to a bundle collection center where the size and weight of the bundles is inspected and the bundles are either accepted or rejected depending upon correspondence of the bundles to optimum size and weight characteristics. If accepted, apparatus at the collection center will issue compensation to the depositor of the bundle and will automatically accumulate accepted bundles in a storage module also provided at the collection center. Periodically, the bundles of newspaper collected in the storage module will be transported to a newsprint recycling facility.

15 Claims, 5 Drawing Figures

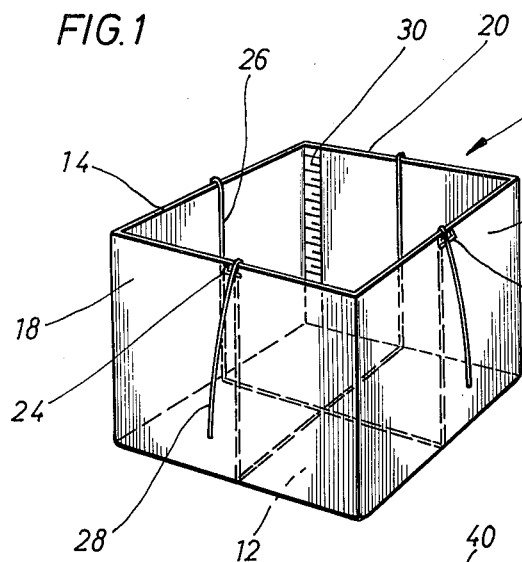
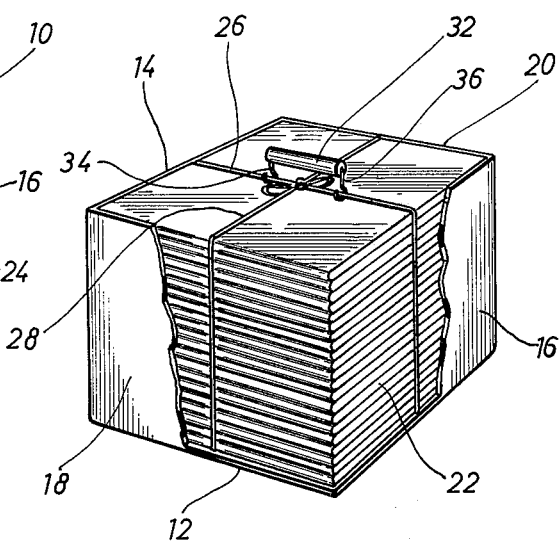
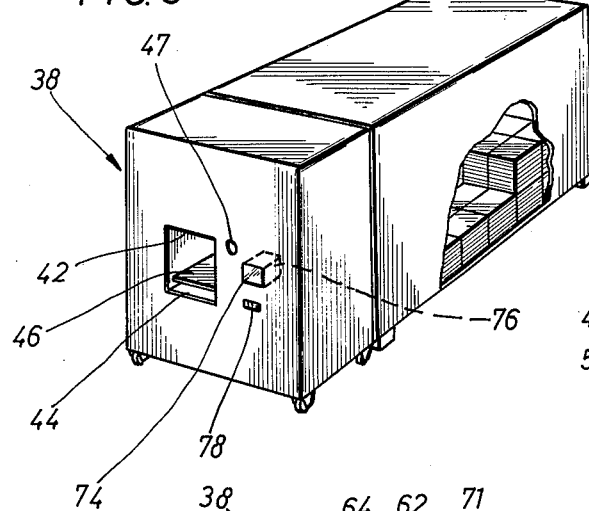
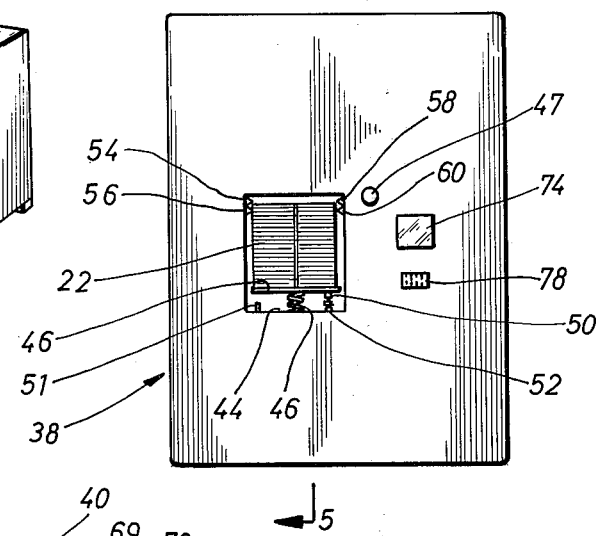
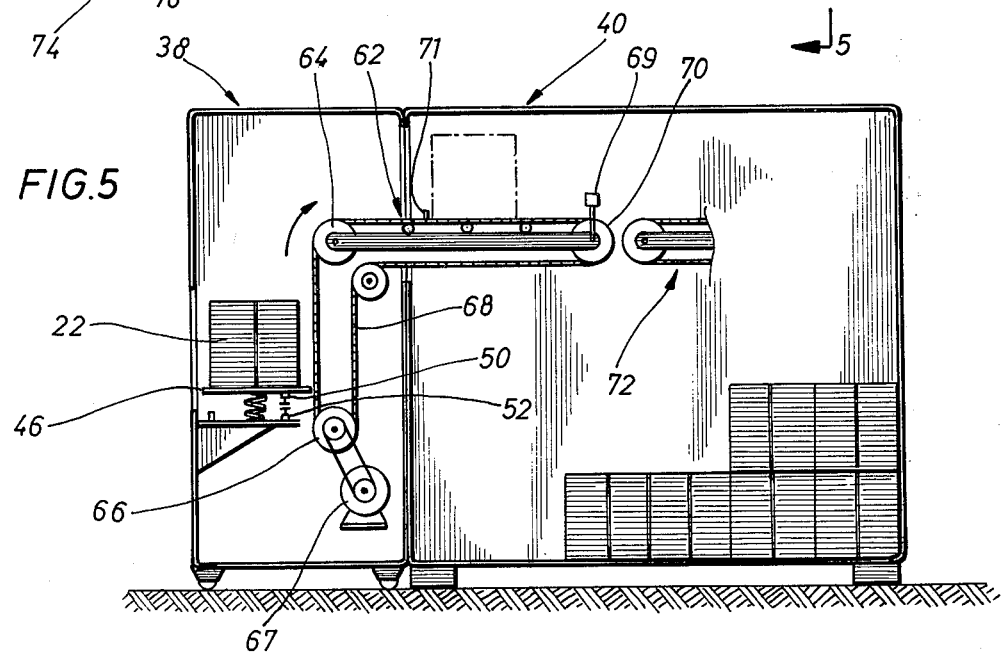

METHOD AND APPARATUS FOR COLLECTION OF NEWSPAPERS FOR RECYCLING

FIELD OF THE INVENTION

The present invention is directed generally to the recycling of paper such as newsprint and more specifically is directed to novel method and apparatus for achieving efficient accumulation and handling of newspapers and other paper products so as to render newsprint recycling commercially feasible and remunerative to individual collectors of the paper and to commercial organizations involved in handling and recycling thereof.

BACKGROUND OF THE INVENTION

It is well known that it is desirable to recycle paper products in order to converse the natural resources that are involved in the manufacture of paper and to protect the environment for excessive contamination by products that are involved in reducing wood into a fibrous material that is appropriate for the manufacture of paper.

It is also well known that one of the most voluminous paper products that can be subjected to recycling is newsprint, which forms an extremely large portion of the paper materials that are available for recycling. One or more newspapers are delivered to a majority of the residences in most countries on a daily basis and several pounds of newsprint is destroyed each week by each family that receives delivery of such newspapers simply because there is no method presently available for efficient collection and handling of newspapers and other paper materials that make it commercially feasible for collection and recycling thereof. It is therefore desirable to provide a simple and efficient method of collecting newsprint and other paper materials from families, businesses, etc. whereby labor costs and other matters adversely affecting the commercial feasibility of paper recycling may be effectively overcome by a collection and handling system that promotes low cost, high volume collection and transportation of newsprint materials.

The price ordinarily paid for newsprint materials makes it unfeasible or at least undesirable for families and businesses to bother with collection of newsprint and other paper materials and transporting the same to a recycling facility. It is desirable therefore to provide a method of adequately remunerating depositors for newspapers and other paper material collected, thereby providing additional incentive for collection of paper materials to be recycled.

Accordingly it is a primary object of the present invention to provide novel method and apparatus for collection of newsprint and other paper products wherein family dwellings and business establishments may be provided with low cost collection modules that promote efficient and inexpensive collection of newspapers and other paper products into bundles of predetermined size, shape and weight to promote efficient mechanized handling of the same by a high volume paper collection and transporation system.

It is another important object of the present invention to provide novel method and apparatus for binding accumulated stacks of newsprint and other paper materials into bundles that will not become disassembled during mechanized handling of the same.

It is an even further object of the present invention to provide novel method and apparatus for inspecting the size and weight of bundles delivered to a collection center for determination if the size and weight of the bundles is acceptable to a high volume mechanized bundle handling system, thereby facilitating proper stacking and organizing of the bundles to prepare them for mechanized transportation to a recycling facility.

Among the several objects of the present invention is noted the contemplation of a novel method and apparatus for issuing compensation to depositors of bundles of newsprint and other paper materials, which correspondence may be related to the weight of the paper material that is deposited and accepted.

It is also an object of the present invention to provide novel method and apparatus that, responsive to acceptance of bundles of paper of appropriate size and configuration, accumulate the accepted bundles in orderly manner in a storage module for subsequent transportation to a recycling facility.

Other and further objects, advantages and features of the invention will become obvious to one skilled in the art upon an understanding of the illustrative embodiment about to be described and various advantages not referred to herein will occur to one skilled in the art upon employment of the invention in practice.

SUMMARY OF THE INVENTION

In accordance with the method embodied in the present invention, a collection module may be placed in each residence or a number of collection modules may be placed at business establishments for collection of newspapers and other paper products. Each of the collection modules may be in the form of a container having a bottom surface of the size and configuration of typical newspapers. The containers may also incorporate means for retaining binding materials that may be utilized after collection of a suitable amount of newspaper to bind the newspaper into a stabilized bundle that will now become separated during mechanized handling. The container may also be provided with indicia defining markings that reflect the height of the stack of newspaper in the form of weight and which indicia includes a specific marking to indicate the maximum dimension of the stack of bundle of newsprint being collected. For example, the depositor may accumulate newspapers in the container until the level of newspapers reaches the top of the container or an indicia marking indicating that the stack of newspaper is of proper size. When newspaper has been accumulated to define an appropriately sized bundle, the binding material may be utilized to secure the bundle of paper into unitary assembly. The bound bundle of paper may then be transported manually to a collection center where the bundle is accumulated along with other bundles in a collection and storage module pending subsequent transportation to a newspaper recycling facility or regional collection center.

The collection and storage module may be provided with a newspaper bundle receiving window within which may be provided weight and/or height inspecting apparatus that insures that the bundle is of proper size and configuration to be handled by mechanized equipment that accumulates and transports bundles of newspaper.

Apparatus at the newspaper bundle collection and storage center may incorporate a vending module incorporating the newspaper bundle receiving window and also incorporating a vending window that may be utilized by the depositor for receiving a redeemable coupon, voucher, ticket or the like that may be appropriately marked for entitling the depositor to remuneration based upon the weight of the newspaper delivered and accepted by the newspaper bundle collection apparatus. The newspaper bundle will be placed in the newspaper bundle receiving window of the apparatus and inspected both for proper weight and dimension and, if the bundle is of proper size and weight, the vending module will transfer the bundle to the storage module and issue compensation as well as additional binding material to the depositor. A counter on the vending module will indicate the number of bundles placed in the storage module. When the storage module is full (or at regular intervals) the storage module and its contents may be removed and an empty module may be substituted therefor. The bound newspaper bundles then may be transmitted to a regional collection center or to a recycling facility.

As the newspaper bundle is inserted through the receiving window of the vending module, it will be placed on a loading plate which rests upon a spring or other suitable weighing device and which is attached to a base plate. A light source activates a light receiver and is utilized to determine whether the height of the bundle is within proper limits for handling by the mechanized bundle handling system. If the bundle is of a height such that it interrupts a light beam between the light source and receiver, the bundle may be accepted by the vending module. If the bundle is of incorrect height or weight, it is rejected. If accepted, the compensation in the form of an appropriately marked ticket will be issued to the depositor through the vending window of the vending module and additional binding material will also be transmitted along with the compensation ticket.

When the newspaper bundle is of proper weight and height, a motor is activated moving a conveyor that transports the loading plate and the newspaper bundle supported thereby, transporting them to the storage module. The loading plate, responsive to switch actuation of the motorized control for the loading plate will return to its position at the receiving window of the vending module and deenergize the power circuitry of the apparatus until the inspection circuitry is again activated for inspection of a subsequent paper bundle.

The apparatus will stack the bundle in orderly manner within a storage module or on a pallet and the storage module or pallet will be transported to a recycling or central storage facility at intervals, being replaced by an empty storage module or pallet. In the alternative, the bundles may be loosely deposited within a storage module which will be separated from other apparatus at a collection center and transported to a recycling facility, being replaced with an empty storage module so that collection can be continuous.

BRIEF DESCRIPTION OF THE DRAWINGS

In order that the manner in which the above recited advantages and objects of the invention are attained, as well as others, which will become apparent, can be understood in detail, more particular description of the invention, briefly summarized above, may be had by reference to the specific embodiment thereof which is illustrated in the appended drawings, which drawings form a part of this specification. It is to be understood, however, that the appended drawings illustrate only a typical embodiment of the invention and are therefore not to be considered limiting of its scope, for the invention may admit to other equally effective embodiments.

In the Drawings:

FIG. 1 is an isometric view of a collection module illustrating assembly of binding means to the collection module by means of full and broken lines.

FIG. 2 is an isometric view having parts thereof broken away and illustrating a bundle of newspapers being collected within the collection modules and illustrating binding of the bundle of newspapers into a unitary bundle assembly and showing assembly of a carrying handle to the bundle to facilitate manual transportation thereof.

FIG. 3 is an isometric view of vending and storage modules that are assembled at a newspaper bundle collection center for the purpose of receiving bundles of newspaper that are subsequently transported to a newsprint recycling facility and having a portion thereof broken away, showing collection of newspaper bundles within the storage module.

FIG. 4 is an elevational view of the vending module illustrated in FIG. 3, depicting apparatus for verifying proper size and configuration of the modules that are to be received by the newspaper bundle handling and transportation system.

FIG. 5 is a sectional view taken along line 5—5 of FIG. 4 and illustrating the receiving inspecting and conveying mechanism of the apparatus in detail.

DETAILED DESCRIPTION OF PREFERRED EMBODIMENT

Now referring to the drawings and first to FIG. 1, there is illustrated a newspaper collection module generally at 10 having a bottom wall 12, side walls 14 and 16 a front wall 18 and a rear wall 20. The bottom wall 12 is of substantially the size and configuration of typical newspapers and newspapers placed within the container will automatically assume a rather concise and properly oriented stack as shown in FIG. 2 at 22.

It will be desirable to bind the stack of newspapers within the container while the stack is properly oriented and according to the present invention, suitable means for accomplishing such binding may conveniently take the form of a plurality of binding retainer elements such as shown at 24 in FIG. 1, which may be affixed to each of the front rear and side walls of the container 10 and which may be utilized to retain strips of bundle binding material such as shown at 26 and 28 during collection of newspapers within the container. The binding material may take the form of tape, heavy string or any of a number of commercially available binding materials which may also be recyclable.

It will be desirable to collect newspapers or other paper material within the container until the same have reached an appropriate height, which height will reflect accumulation of newsprint that may be reflected in terms of weight since newsprint and other paper materials will be of particular weight after having been accumulated in specific volume. Obviously, paper of more dense quality as compared to newsprint may also be collected and may be compared to indicia 30 for an indication of the particular weight of material that is accumulated within the container, thereby giving the depositor some indication of the weight of paper that is being presented to collection and storage apparatus for monetary reward.

It will be desirable to collect paper material such as newspapers and other paper products and to assemble the same into bundles that are of consistent dimension in order that the bundles may be readily handled by mechanized handling and transporting equipment that promotes low cost handling and transportation and which promotes efficiency of the commercial operation and enhances the commercial feasibility of the newspaper collection system. The containers 10 may be of particular height to define the limits of a bundle of paper that is accumulated therein. When paper has accumulated to the point that it reaches the level of the upper edges of the walls of the container, the bundle will be of proper dimension to be received by the mechanized collection and handling system. After accumulation of paper to the height defined by the upper edges of the walls, the binding material, which may conveniently take the form of rather heavy string may be brought over the stack of paper and the ends thereof may be appropriately secured in assembly so as to retain the stock of paper in a unitary bundle that will not become disassembled during mechanized handling thereof. If desired, a handle structure such as shown at 32 may incorporate connection devices 34 and 36 that may be attached to the bindings thereby allowing the depositor to grasp the handle 32 in order to remove the assembled and bound bundle of paper from the container and transport it to a collection center for receiving bundles of proper size and configuration.

With reference now to FIGS. 3, 4 and 5, there is depicted a paper bundle receiving module illustrated generally at 38 that may be disposed in assembly with a storage module illustrated generally at 40. It will be desirable to provide a suitable means that may be utilized simply and efficiently for receiving bundled paper from depositors and for providing the depositors with remuneration for the value of the paper so deposited. It is also desirable that means be provided to accept only those bundles of paper that are of proper dimension in order that the bundles may be simply and efficiently stacked and otherwise handled by mechanized article handling apparatus thereby facilitating mechanized handling that promotes low cost paper collection operations. It may be also desirable to provide an acceptable means for insuring that paper bundles are of proper weight to further promote efficient article handling and to prevent the machine from accepting materials other than paper. In accordance with the present invention, one suitable mechanism for accepting properly sized and properly weighted bundles and for providing remuneration to the depositor of the bundles may conveniently take the form illustrated in FIGS. 3, 4 and 5 where the storage module 38 may be provided with a receiving window or opening 42 within which may be located a base plate 44 above which may be movably disposed a loading plate 46 that may be supported above the base plate by means of a compression spring 48 or some other weight sensitive element. An electrical contact 50 may be carried by the movable loading plate 46 while a second electrical contact 52 may be supported by the base plate 44 and may be disposed for engagement by the upper contact 50 for completion of an appropriate weight acceptance circuit if the weight of a paper bundle 22 placed on the loading plate 46 is sufficient to collapse the compression spring 48 to the extent that contacts 50 and 52 come into engagement. A button type switch actuator 47 will be located on the receiving and inspection module and will be manipulated manually to initiate an inspection and handling sequence that may be controlled electrically.

It will be desirable to transport an accepted bundle of paper from the receiving window or opening 42 to a storage module 40 where the paper may be deposited pending subsequent pick up and transportation to a paper recycling facility.

For the purpose of determining whether or bound bundles of paper are proper height to facilitate optimum handling and stacking by mechanized article handling equipment, upper and lower light sources 54 and 56 may be employed that may be disposed in spaced relation to upper and lower light receiver elements 58 and 60. If the bound bundle of paper 22 is of sufficient height to interrupt a light beam between the source 56 and the receiver 60 but insufficient to interrupt the light beam between source 54 and receiver 58, an acceptance signal will be generated allowing the bundle 22 to be accepted by the paper receiving and storage system. If the light beams of both sources are either interrupted or uninterrupted, the bundle will be of improper height and will be rejected.

It will be desirable to transport accepted bundles of paper from the receiving opening 42 to the storage module 40 and to deposit the accepted bundle of paper in orderly manner in the storage module in order that it may be efficiently handled and shipped for recycling. It is of course desirable that the bundles of paper be stacked neatly within the storage module, which storage module may then be separated from the paper bundle receiving module and transported to a recycling facility, being replaced by an empty storage module. In the alternative, it may be desirable to provide the storage module with a pallet assembly and a mechanism may be employed to stack the paper bundles in neat and perhaps interlocked manner on the pallet which may be subsequently removed from the storage module and transported to the recycling facility, the storage module being provided with an empty pallet to take its place.

In order to transport an accepted bound paper bundle from the bundle receiving window 42 to the storage module, any suitable conveyor mechanism may be employed. As shown in FIG. 5, an exemplary form of conveyor may comprise a conveyor mechanism illustrated generally at 62 having a vertical portion including conveyor rollers 64 and 66 that receive a chain or belt type continuous conveyor 68. A reversible electric motor 67 may be employed for driving the conveyor. The conveyor may also include a generally horizontal portion including conveyor roller 64 and conveyor roller 70. The loading plate 46 may be connected to the continuous conveyor in such manner that it is caused to rise generally vertically from the receiving window and then be translated generally horizontally on the upper portion of the conveyor as shown in broken line. A microswitch 69 may be contacted by a paper bundle on the conveyor or by a microswitch actuator carried by the conveyor, as shown at 71, which will cause the motor 67 to reverse, driving the loading plate back to the FIG. 5 position thereof after the bundle has been ejected from the conveyor.

The conveyor 62 will be capable of transmitting the accepted bundles onto bundle stacking apparatus illustrated generally at 72, which stacking apparatus may conveniently take any one of a number of commercially available forms without departing from the spirit or scope of the present invention. For example, the conveyor mechanism illustrated in FIG. 5 may be a feed device for bundle stacking apparatus such as is set forth in U.S. Pat. No. 3,757,966 or any other suitably commercially available apparatus capable of stacking the paper bundles into a stabilized stack on a pallet or within a storage module. Note, that U.S. Pat. No. 3,757,966 teaches interlocking of the various tiers stacked onto a pallet.

Also, if desired, the conveyor mechanism 62 may be utilized for merely transporting bound bundles of paper from the receiving and inspection module to the storage module where the bundles may simply be allowed to gravitate into the lower portion of the storage module. Of course, storing and handling paper bundles in this manner would be less than desirable from the standpoint of efficiency of mechanized handling, but the expense of the same would be far less as compared to providing specialized equipment for orderly stacking of bundles of paper within the storage module or on a pallet present in the storage module.

It is desirable that remuneration be paid to the depositor upon acceptance of the bundles of paper by the bundle acceptance apparatus and to accomplish such payment, the receiving and inspection module 38 may be provided with a vending window 74 within which may be disposed suitable vending apparatus 76 capable of issuing appropriate cash, marked tickets, vouchers or the like which may be representative of the value of the paper delivered. The vending apparatus 76 may be capable of simply vending premarked vouchers that reflect a standard payment for accepted paper bundles. For example, a voucher worth 0.25 cents may be delivered to the depositor through the vending window 74 upon acceptance of a paper bundle by the apparatus. In the alternative, suitable commercially available vending apparatus may be employed having the capability of vending vouchers or tickets that are marked in monetary terms in accordance with the particular weight of the bundle delivered.

It will also be desirable for the apparatus to provide some indication of the number of bundles that have been accepted in order that transportation personnel may be readily aware when the apparatus is full or substantially full of paper bundles, thereby further promoting efficiency of handling and transporting the bundles for recycling. In accordance with the present invention a conventional counting mechanism 78 may be provided in the receiving and inspection module and may be visually inspected for a determination of the number of bundles that have been accepted. Mere inspection of the counting mechanism 78 will advise transportation personnel when the apparatus is full of paper bundles and transportation of the bundles to a recycling facility is in order.

OPERATION

A newspaper accumulation or collection module may be provided for the individual newspaper subscriber or at business establishments. The subscriber will place used newspapers in the accumulation module or container and when it is full or when the height of the stack of newspaper within the container reaches a predetermined level, the subscriber will bind the bundle of newspaper with the binding elements such as tape, heavy string or the like and will remove it from its container for transportation to a collection and storage facility. It is considered that storage facilities will be rather small and may be located at places frequented regularly by large numbers of newspaper subscribers. It is considered that parking lots of food stores, shopping centers and the like will be practical places for location of newspaper bundle collection and storage apparatus.

The subscriber will take his bundle of used newspapers to a collection center and will deposit it in the newspaper bundle collection machine. The machine will accept a bundle of proper size and weight and issue compensation to the subscriber as well as issuing new binding material. The compensation may be in the form of trading stamps, cash or a discount coupon redemable at a retail establishment. It is expected that retail stores will redeem such discount coupons thereby allowing the depositor to quickly convert the cash value of the discount coupon at commercial locations that are visited frequently.

The newspaper bundle collection machine of the present invention consists of an inspection and vending module that may be interfitted in any suitable manner with the storage module. The newspaper bundle will be placed in the newspaper bundle receiving window and if the bundle is of proper size and weight, the vending module will transfer the bundle to the storage module and activate the vending apparatus for issuance of compensation and binding material to the depositor. A counting device that is provided on the vending module will indicate the number of bundles placed in the storage module. When it is full or at regular intervals the storage module and its contents will be removed and an empty module substituted in its place. The bundled newspapers will then be transported to a regional collection center or recycling plant.

With regard to operation of the paper bundle inspection and storage apparatus, one or more of the light beams between the light sources and light receivers will be interrupted when a newspaper bundle is placed on the loading plate. The compression spring that supports the loading plate in the receiving thereof will be depressed by the weight of the bundle, thereby causing the appropriate one of the light beams to be interrupted when the bundle is of proper height and weight. Wheen a bundle of sufficient weight is placed on the loading plate, the spring will be depressed activating the switch contacts 50 and 52 thereby giving a signal which is considered along with the signal provided by the light sources. The bundle will be accepted if it is of proper height and weight. If it has incorrect weight or height it will be rejected.

When newspaper bundles are accepted, the electric motor 67 is activated through appropriate control circuitry and movement is imparted to the conveyor mechanism 62 causing the conveyor to transport paper bundles into the storage module. A microswitch 69 that is disposed at the extremity of the conveyor mechanism will be activated when the paper bundle clears the conveyor 62 and when this occurs, the direction of the motor 67 will be reversed and the conveyor will again move the loading plate 46 back to the position illustrated in FIG. 5. The electric motor will be deenergized at this particular position and the mechanism will remain dormant until inspection of a subsequent paper bundle is desired. The depositor after placing the paper bundle on the loading plate of the machine will simply depress a sequence button 47 connected to an appropriate electrical contactor that will energize the control circuitry of the apparatus. The height and weight of the paper bundle will be automatically inspected and if accepted, the conveyor mechanism will be automatically energized conveying the bundle to the storage module. The conveyor mechanism will then return to its starting position and, upon engagement of a microswitch 51 or some other suitable control device, the electrical circuitry of the machine will be deenergized and will remain so until the start button 47 is again activated manually by the depositor.

In view of the foregoing it is apparent that the present invention is well adapted to attain all of the objects and advantages hereinabove set forth, together with other objects and advantages that will become obvious and inherent from the description of the apparatus itself. It will be understood that certain combination and subcombinations are of utility and may be employed without reference to other features and subcombinations. This is contemplated by and is within the scope of the appended claims. As many possible embodiments may be made of the invention without departing from the spirit or scope thereof, it is to be understood that all matters herein set forth or shown in the accompanying drawings are to be interrupted as illustrative and not in any limiting sense.

What is claimed is:

1. A method for collection of newspaper for recycling and remitting payment of compensation to depositors for paper collected and deposited at a collection center for such paper, said method comprising:
    placement of paper into a container that is of the substantial size and shape of the paper being collected and thereby accumulating a bundle of said paper;
    when said bundle of paper has accumulated to a predetermined dimension relative to the size of the container, placing binding means about the accumulated bundle of paper within the container;
    removing the bound bundle of paper from said container;
    transporting the bundle of paper to a paper collection center;
    inspecting the bound bundle of paper for proper size and weight;
    remitting compensation as payment for collected bundles of paper of proper size and weight;
    accumulating accepted bundles of paper in orderly manner; and
    periodically transporting accumulated bundles of paper to a paper recycling facility.

2. The method recited in claim 1, including:
    placement of bundle binding means into assembly with said container prior to placement of the paper into said container.

3. The method recited in claim 1, including:
    determining the proper weight of accumulated bundles while the paper is disposed within the container by comparing the dimension with indicia provided on said container.

4. The method recited in claim 1, wherein:
    said compensation is issued in the form of a credit voucher having a cash value.

5. The method recited in claim 1, including:
    attachment of manual bundle transporting means to bundles of paper collected and bound within said container to facilitate manual transportation of said bundles to said paper bundle collection center.

6. The method recited in claim 1, wherein a paper storage and transportation module is provided at said paper collection center and said method includes:
    stacking said accumulated and accepted bundles of paper onto pallet means; and
    said transporting being accomplished by transporting palletized stacks of newspaper bundles.

7. The method recited in claim 1, wherein a paper storage and transportation module is provided at said paper collection center and said method includes:
    depositing said accumulated and accepted bundles of paper within said storage and transportation module;
    separating said storage and transportation module from bundle receiving and inspection apparatus at said paper collection center; and
    transporting said storage and transportation module to a paper recycling facility, an empty storage and transportation module being substituted therefor.

8. Apparatus for collection of paper for recycling and remitting payment of compensation to depositors for paper collected into bundles of proper size and weight and deposited at a collection center for such paper, said apparatus comprising:
    a paper bundle module of a size and configuration corresponding to the size and configuration of the paper to be collected and being of predetermined dimension for accumulation of a bundle of paper of predetermined size and weight;
    means provided on said paper bundle module for receiving bundle binding means that is employed after collection of a bundle of paper of predetermined size for binding the bundle of collected paper as the collected bundle of paper is disposed within said collection module;
    paper receiving, inspection and storage means defining a collection center for bound bundles of paper of proper size and weight and including a receiving module and a storage module;
    weight inspection means being provided on said receiving module, said weight inspection means having acceptance and rejection signal means and providing one of said acceptance and rejection signals responsive to the weight of the bundle of paper placed at said weight inspection means;
    dimension inspection means being provided on said receiving module and having acceptance and rejection means that are selectively activated responsive to the dimension of the bundle of paper placed at said dimension inspection means; and
    means for transporting accepted bundles of paper from said receiving module to said storage module.

9. Apparatus as recited in claim 8, wherein said means for transporting said accepted bundles of paper to said storage module comprises:
    loading plate means for receiving bundles of paper;
    conveyor means being connected to said loading plate means and being operative to convey said loading plate means and said bundle of paper disposed thereon to said storage module and to deposit said paper bundle within said storage module; and
    control means for causing controlled movement of said conveyor means from said receiving module to said storage module and then returning said loading plate means to said receiving module.

10. Apparatus as recited in claim 9, wherein:
said conveyor means is electrically powered and, upon being energized, is actuated by a control sequence that begins and ends with said loading plate positioned at said receiving module.

11. Apparatus as recited in claim 8, wherein said weight inspection means comprises:
yieldable means supporting said loading plate means prior to initiation of said conveyor means; and
electrical contact means being provided on said loading plate means and said receiving module, said contact means engaging and completing an electrical circuit and providing an acceptance signal when the bundle supported on said loading plate is of sufficient weight to cause predetermined compression of said yieldable means.

12. Apparatus as recited in claim 8, wherein said dimension inspection means comprises:
light source means;
light receiver means being disposed relative to said light source means to receive a light beam transmitted by said light source means; and
electrical signal circuitry being connected to said light receiver means and transmitting an acceptance signal when said light beam means is interrupted by a paper bundle of proper dimension.

13. Apparatus as recited in claim 12, wherein:
said light source means comprises a plurality of light sources; and
said light receiver means comprises a plurality of light receivers each having electrical acceptance circuitry.

14. Apparatus as recited in claim 8, including:
means for dispensing at least one object having monetary value to the depositor of an acceptable bundle of paper.

15. Apparatus as recited in claim 8, including:
counting means being provided on said apparatus and counting the number of bundles accepted by said apparatus and deposited within said storage module.

* * * * *